(12) United States Patent
Konigsberg et al.

(10) Patent No.: US 10,735,384 B2
(45) Date of Patent: Aug. 4, 2020

(54) TECHNIQUES FOR KEY RATCHETING WITH MULTIPLE STEP SIZES

(71) Applicant: WhatsApp, Inc., Menlo Park, CA (US)

(72) Inventors: Derek Alan Konigsberg, Mountain View, CA (US); George Nachman, Sunnyvale, CA (US); Chun Wing Yuen, Foster City, CA (US); Ehren Andrew Kret, Sunnyvale, CA (US)

(73) Assignee: WHATSAPP INC., Menlo Park, CA (US)

( * ) Notice: Subject to any disclaimer, the term of this patent is extended or adjusted under 35 U.S.C. 154(b) by 224 days.

(21) Appl. No.: 15/649,929

(22) Filed: Jul. 14, 2017

(65) Prior Publication Data

US 2018/0241725 A1    Aug. 23, 2018

Related U.S. Application Data

(60) Provisional application No. 62/460,128, filed on Feb. 17, 2017.

(51) Int. Cl.
*H04L 29/06*      (2006.01)
*G06F 21/60*      (2013.01)
(Continued)

(52) U.S. Cl.
CPC ........ *H04L 63/0435* (2013.01); *G06F 21/606* (2013.01); *H04L 9/0861* (2013.01);
(Continued)

(58) Field of Classification Search
CPC ............. H04L 63/0428; H04L 63/0869; H04L 63/0861; H04L 9/0861; H04L 9/32;
(Continued)

(56) References Cited

U.S. PATENT DOCUMENTS 7,783,043 B1 *   8/2010   Dondeti ................ H04L 9/0833
                                                    380/278
8,676,896 B1 *   3/2014   O'Neil ................. H04L 63/0428
                                                    709/206

(Continued)

OTHER PUBLICATIONS

Trevor Perrin et al., The Double Ratchet Algorithm, (Year: 2016).*
(Continued)

*Primary Examiner* — Kambiz Zand
*Assistant Examiner* — Mahabub S Ahmed

(57) ABSTRACT

Techniques for key ratcheting with multiple step sizes are described. For example, an apparatus may be configured to receive two or more encrypted messages, where the encrypted messages are encrypted according to a multi-dimensional ratcheting encryption scheme. Moreover, the apparatus may be configured to determine which of the encrypted messages was most-recently received and extract a message iteration count from the most-recent encrypted message, generate a decrypted message by decrypting the encrypted message based on a decryption key, decompose the message iteration count into a plurality of message chain key iteration counts, and determine the decryption key based on the plurality of message chain key iteration counts.

20 Claims, 9 Drawing Sheets

(51) Int. Cl.
*H04W 12/02* (2009.01)
*H04L 9/08* (2006.01)
*H04L 9/32* (2006.01)

(52) U.S. Cl.
CPC ......... *H04L 63/0869* (2013.01); *H04W 12/02* (2013.01); *H04L 9/32* (2013.01); *H04L 63/061* (2013.01); *H04L 63/065* (2013.01); *H04L 63/126* (2013.01); *H04L 2209/38* (2013.01)

(58) Field of Classification Search
CPC ....... H04L 9/14; H04L 63/061; H04L 63/065; H04L 63/126; H04L 63/062; H04L 2209/24; H04L 2209/38; H04L 9/0816; H04L 63/0435; H04L 9/0822; H04L 2463/061; H04L 9/0838; H04L 9/0819; H04L 9/08; H04L 9/00; G06F 21/606; H04W 12/02
USPC .......................................................... 713/155
See application file for complete search history.

(56) References Cited

U.S. PATENT DOCUMENTS

| | | | | |
|---|---|---|---|---|
| 9,374,373 | B1* | 6/2016 | Chan | H04L 9/3247 |
| 10,019,591 | B1* | 7/2018 | Beguin | H04L 63/108 |
| 10,129,223 | B1* | 11/2018 | Bhattacharyya | H04L 63/061 |
| 10,218,502 | B2* | 2/2019 | Le Saint | H04L 9/0844 |
| 2001/0005883 | A1* | 6/2001 | Wray | H04L 9/0844 |
| | | | | 713/151 |
| 2004/0028227 | A1* | 2/2004 | Yu | H04L 63/0428 |
| | | | | 380/201 |
| 2006/0002550 | A1* | 1/2006 | Campagna | H04L 9/0643 |
| | | | | 380/46 |
| 2006/0129811 | A1* | 6/2006 | Fiske | H04L 9/0631 |
| | | | | 713/167 |
| 2006/0171534 | A1* | 8/2006 | Baughman | H04L 9/0618 |
| | | | | 380/47 |
| 2007/0127719 | A1* | 6/2007 | Selander | H04L 9/0891 |
| | | | | 380/277 |
| 2008/0270308 | A1* | 10/2008 | Peterka | G06F 21/10 |
| | | | | 705/51 |
| 2009/0210704 | A1* | 8/2009 | Han | G06F 21/10 |
| | | | | 713/158 |
| 2009/0280774 | A1* | 11/2009 | Patel | H04L 9/0891 |
| | | | | 455/410 |
| 2011/0135097 | A1 | 6/2011 | Redfern et al. | |
| 2012/0173880 | A1* | 7/2012 | Swaminathan | G06F 21/10 |
| | | | | 713/189 |
| 2014/0052989 | A1 | 2/2014 | Jones et al. | |
| 2014/0169554 | A1* | 6/2014 | Scarisbrick | H04L 9/0863 |
| | | | | 380/28 |
| 2015/0033016 | A1* | 1/2015 | Thornton | H04L 9/0825 |
| | | | | 713/171 |
| 2015/0156181 | A1* | 6/2015 | Kerberg | H04L 9/0833 |
| | | | | 726/6 |
| 2015/0271159 | A1* | 9/2015 | Springer | H04L 9/0844 |
| | | | | 713/171 |
| 2016/0127914 | A1* | 5/2016 | Starck | H04W 4/14 |
| | | | | 455/466 |
| 2016/0321460 | A1* | 11/2016 | Suter | G06F 21/6209 |
| 2017/0126409 | A1* | 5/2017 | Freudiger | H04W 12/02 |
| 2017/0250796 | A1* | 8/2017 | Samid | H04L 9/0838 |
| 2017/0331624 | A1* | 11/2017 | Samid | H04L 9/0618 |
| 2017/0359717 | A1* | 12/2017 | Adler | H04L 9/0891 |
| 2018/0063094 | A1* | 3/2018 | Albrecht | H04L 9/0637 |
| 2018/0069695 | A1* | 3/2018 | Bowman | H04L 9/0891 |
| 2018/0131788 | A1* | 5/2018 | Roberts | H04L 67/1095 |
| 2018/0198629 | A1* | 7/2018 | Deymonnaz | H04L 63/0823 |
| 2018/0359228 | A1* | 12/2018 | Lerner | H04L 63/0457 |
| 2019/0140827 | A1* | 5/2019 | Suominen | H04L 63/083 |
| 2019/0215158 | A1* | 7/2019 | Okano | G09C 1/00 |

OTHER PUBLICATIONS

Moxie0, Advanced cryptographic ratcheting, signals (Year: 2013).*
Katriel Cohn-Gordon et al., A Formal Security Analysis of the Signal Messaging Protocol, (Year: 2016).*
Trevor Perrin et al., The Double Ratchet Algorithm, source: www.google.com (Year: 2016).*
Tilman Frosch etal, How Secure is TextSecure?, IEEE (Year: 2016).*
Katriel Cohn-Gordon etal., A Formal Security Analysis of the Signal Messaging Protocol; source: www.google.com (Year: 2016).*
MoxieO, Advanced cryptographic ratcheting, signals, source: www.google.com (Year: 2013).*
Ian Goldberg et al., Multi-party Off-the-Record Messaging, CCS (Year: 2009).*
Nik Unger et al., SoK: Secure Messaging, IEEE (Year: 2015).*
Verschoor, Secure messaging in mobile environments, Eindhoven University of Technology—from scholar.google.com (Year: 2016).*
European Search Report for European Patent Application No. EP17198508, dated Apr. 25, 2018, 2 pages.
Whatsapp: "WhatsApp Encryption Overview", • Apr. 5, 2016 (Apr. 5, 2016), XP055467664, Retrieved from the Internet: URL:https://www.whatsapp.com/security/What sApp-Security-Whitepaper.pdf [retrieved on Apr. 16, 2018] *pp. 3, 5, 8, 9*.
Trevor Perrin: "The Double Ratchet Algorithm", • Nov. 20, 2016 (Nov. 20, 2016), pp. 1-35, XP055323143, Retrieved from the Internet: URL:https://whispersystems.org/docs/specifications/doubleratchet/doubleratchel.pdf [retrieved on Nov. 25, 2016] *Sections 2 and 3. *.
Whatsapp: "WhatsApp Encryption Overview", • Apr. 4, 2016 (Apr. 4, 2016), XP055467840, Retrieved from the Internet: URL:https://assets.documentcloud.org/docum ents/2806301/WhatsApp-Security-Whitepaper-1.pdf [retrieved on Apr. 17, 2018] * the whole document*.
International Search Report received for PCT Patent Application No. PCT/US2017/042399, dated Nov. 8, 2017, 3 pages.
Perrin et al., "The Double Ratchet Algorithm", Nov. 20, 2016, 35 pages.
Cohn-Gordon et al., "A Formal Security Analysis of the Signal Messaging Protocol", Oct. 2016, 43 pages.
International Preliminary Report on Patentability for the International Patent Application No. PCT/US2017/042399, dated Aug. 22, 2019, 7 pages.

* cited by examiner

*800*

US 10,735,384 B2

TECHNIQUES FOR KEY RATCHETING WITH MULTIPLE STEP SIZES

RELATED APPLICATIONS

This application claims the benefit of priority under 35 U.S.C. § 119(e) to U.S. Provisional Patent Application No. 62/460,128, titled "Techniques for Key Ratcheting with Multiple Step Sizes," filed on Feb. 17, 2017, which is hereby incorporated by reference in its entirety.

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging clients, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for key ratcheting with multiple step sizes. Some embodiments are particularly directed to techniques for key ratcheting with multiple step sizes for multi-dimensional ratcheting. In one embodiment, for example, an apparatus may comprise a messaging component operative to receive an encrypted message, the encrypted message encrypted according to a multi-dimensional ratcheting encryption scheme; determine a message iteration count for the encrypted message; and generate a decrypted message by decrypting the encrypted message based on a decryption key; and a key management component operative on the processor circuit to decompose the message iteration count into a plurality of message chain key iteration counts; and determine the decryption key based on the plurality of message chain key iteration counts. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

Embodiments according to the invention are in particular disclosed in the attached claims directed to a method, a storage medium, an apparatus and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DETAILED DESCRIPTION

Figure 1:
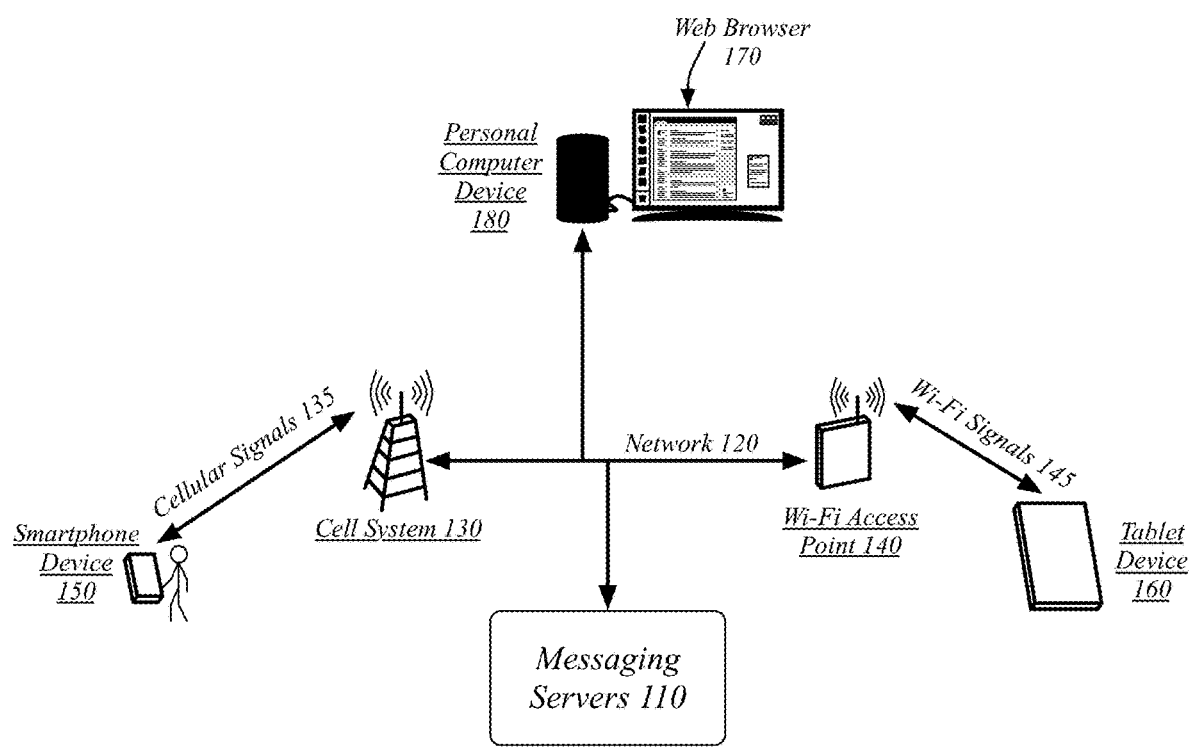
FIG. 1 illustrates an embodiment of an encrypted message system.

A message sent between devices may be encrypted while it is in transit between the devices. A message may be encrypted according to an encryption key and decrypted according to a decryption key, which may be the same key. The key or keys used to encrypt and decrypt a message may be synchronized between devices to empower the decryption of the encrypted message according to the correct decryption key.

The devices may use key ratcheting to iteratively advance the key or keys used to encrypt and decrypt successive messages. A ratchet function may be used where a series of keys can be produced, thereby allowing a different key to be used for each message, such that a recovery of a key by an attacker cannot be used to decrypt message with decryption keys previous in the series of decryption keys used to decrypt a series of messages.

Advancing an encryption key may be a computationally expensive series of operations. It may, at least, be sufficiently computationally expensive that it would be beneficial to avoid a large number of ratchet advancements if possible. As such, if a continuous sequence of messages were to be discarded, it would be beneficial to refrain from generating the decryption keys associated with the discarded messages and instead to skip ahead to generate the decryption key for the next message to be decrypted instead of discarded. By doing so, a device could be spared from having to advance through some or all of the discarded decryption keys, saving time—and thereby increasing responsiveness of the device—and power, particularly on a mobile device.

A scenario in which it may be beneficial to discard a large number of keys may be where incoming encrypted messages contain live information that is frequently updated and where only the most recent iteration of the live information is relevant. For example, the participants in a group message thread may send live location information to each other, with this live location information being frequently updated to empower the accurate displaying of each user's current location. As a live location feature is about sharing and knowing the most recent location of a user, only the most recent live-location update for a particular user is relevant. As such, an update may be out-of-date if made irrelevant by a more-recent update and safely discarded.

Where a device has been offline for a period of time, a live-location feature may result in a device receiving a large number of out-of-date updates. The device may benefit from discarding these out-of-date updates and skipping over the generation of at least a portion of the decryption keys to these out-of-date updates, instead skipping ahead to more efficiently generate the decryption key for the most-recent update. As such, the embodiments may improve the efficiency and responsiveness for a messaging system for a user.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for an encrypted message system 100. In one embodiment, the encrypted message system 100 may comprise a computer-implemented system having software applications comprising one or more components. Although the encrypted message system 100 shown in FIG. 1 has a limited number of elements in a certain topology, it may be appreciated that the encrypted message system 100 may include more or less elements in alternate topologies as desired for a given implementation.

Messaging servers 110 may comprise one or more messaging servers operated by a messaging platform as part of a messaging system. A messaging server may comprise an Internet-accessible server, with the network 120 connecting the various devices of the messaging system comprising, at least in part, the Internet. A messaging system may use the messaging servers 110 to support messaging for various user client devices.

A user may own and operate a smartphone device 150. The smartphone device 150 may comprise an iPhone® device, an Android® device, a Blackberry® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging servers 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging servers 110.

The same user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging servers 110.

A messaging client may be a dedicated messaging client. A dedicated messaging client may be specifically associated with a messaging provider administering the messaging platform including the messaging servers 110. A dedicated messaging client may be a general client operative to work with a plurality of different messaging providers including the messaging provider administering the messaging platform including the messaging servers 110.

The messaging client may be a component of an application providing additional functionality. For example, a social networking service may provide a social networking application for use on a mobile device for accessing and using the social networking service. The social networking service may include messaging functionality such as may be provided by messaging servers 110. It will be appreciated that the messaging servers 110 may be one component of a computing device for the social networking service, with the computing device providing additional functionality of the social networking service. Similarly, the social networking application may provide both messaging functionality and additional social networking functionality.

In some cases a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML5 code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. The first and second messaging applications may comprise installations of the same application on both devices. The first and second messaging applications may comprise a smartphone-specific and a tablet-specific version of a common application. The first and second messaging application may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging servers 110 due to it not maintaining or otherwise not having access to an existing state for the message inbox. The web browser 170 may then retrieve incremental updates for any new changes to the state of the message inbox so long as it maintains a user session with the messaging servers 110, discarding its known state for the message inbox at the end of the session, such as when the web browser 170 is closed by the user. Without limitation, an update may correspond to the addition of a message to a mailbox, a deletion of a message from a mailbox, and a read receipt.

A messaging system may operate by defining a messaging inbox as comprising a plurality of messages, wherein each message is an individual transaction of communication between two or more participants. A mail server may operate by maintaining a message index for the messaging inbox. Mail servers may receive messages and store the messages in mail archives from which messages may be retrieved through reference to the message index. Mail clients may connect to the mail servers and retrieve messages that have been added to their mail archive since their last update. The mail clients may receive a mail index from the mail archive indicating what messages are stored in the mail archive. The mail clients may compare the mail archive to their current inbox in order to determine what messages they are missing, which they then request from the mail archive. The mail clients may make changes to their inbox, which results in mail inbox instructions being transmitted to the mail archives instructing the mail archives in modifications to make to the representation of their mail inbox on the mail archives.

Messaging interactions mediated by a messaging system may be organized into shared spaces known as message threads. A message thread may collect together the messages shared between a particular group of users. Messages sent individually between a pair of users may be collected into a one-on-one message thread uniquely associated with the private messaging between the pair of users. Messages sent between a group of three or more users may not be uniquely defined by their membership, but instead by, in some embodiments, an identifier uniquely identifying the group thread. Membership in a group thread may, in some embodiments, vary over time, adding and/or losing members.

Messaging interactions may use end-to-end encrypted communication between client devices. A sending client device may encrypt an outgoing message using security techniques that establish one of only the receiving device being able to decrypt the outgoing message (e.g., by using public-key cryptography) or only the sending and receiving devices being able to decrypt the outgoing message (e.g., by using shared-key cryptography). In these embodiments, the servers of the messaging system may be prevented from decrypting messages being sent between clients. However, in other embodiments, while encrypted communication may be used between the client devices and server devices, the messaging server devices may be empowered to examine the contents of user messages. Such examination may be used to provide services to the users of the messaging system. In some embodiments, users may be empowered to select whether a particular message thread uses end-to-end encryption (and thereby receive the additional privacy of the messaging servers being prevented from examining the contents of messages) or doesn't (and thereby receive the benefit of the messaging system being able to programmatically examine messages and offer relevant services to the users).

The messaging system may use knowledge generated from interactions in between users. The messaging system may comprise a component of a social-networking system and may use knowledge generated from the broader interactions of the social-networking system. As such, to protect the privacy of the users of the messaging system and the larger social-networking system, messaging system may include an authorization server (or other suitable component(s)) that allows users to opt in to or opt out of having their actions logged by the messaging system or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the messaging system and other elements of a social-networking system through blocking, data hashing, anonymization, or other suitable techniques as appropriate.

Figure 2:
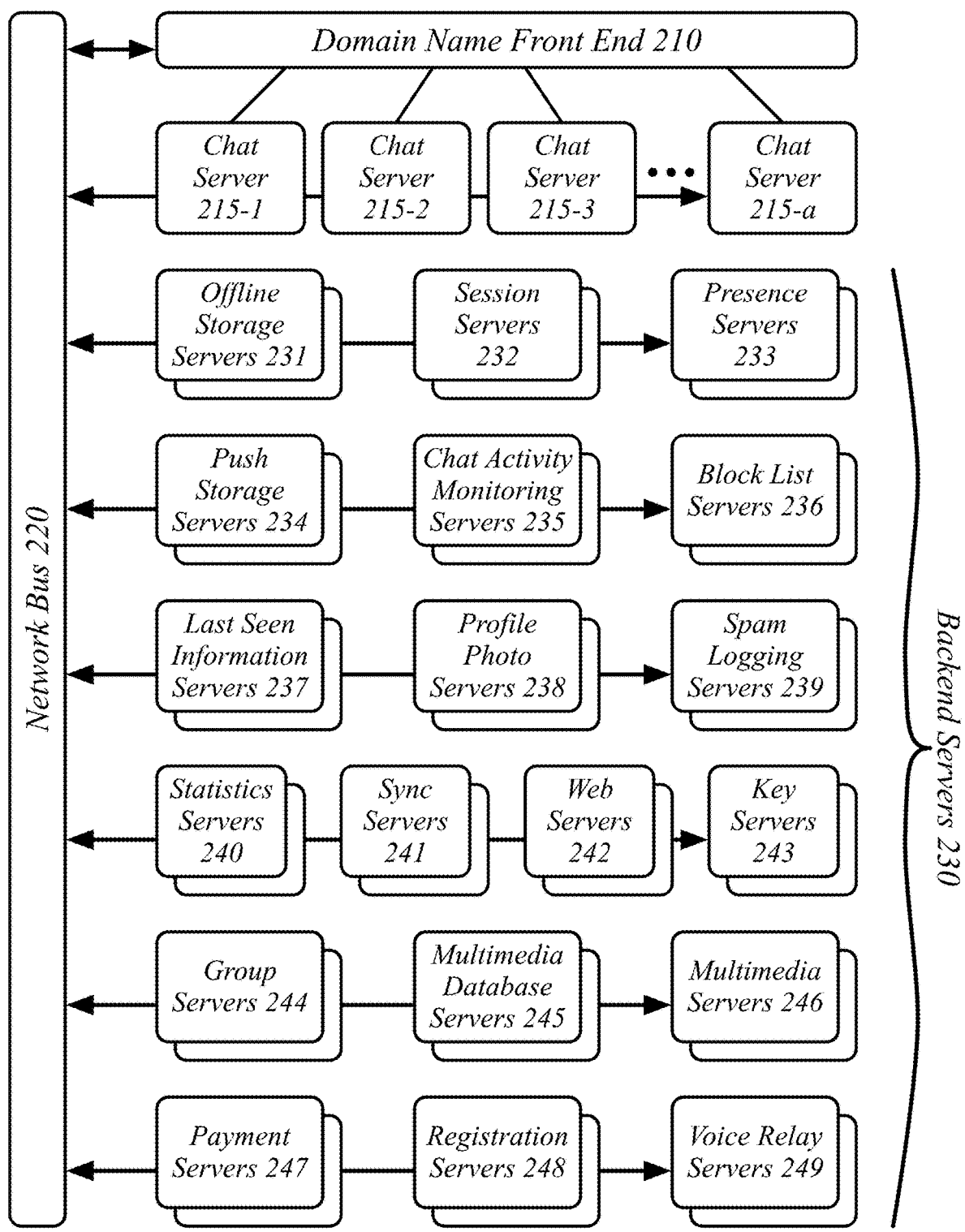
FIG. 2 illustrates an embodiment of a messaging system.

FIG. 2 illustrates an embodiment of a plurality of servers implementing various functions of a messaging system 200. It will be appreciated that different distributions of work and functions may be used in various embodiments of a messaging system 200. The messaging system 200 may comprise the encrypted message system 100 with the operations of the encrypted message system 100 comprising a portion of the overall operations of the messaging system 200. The illustrated embodiment of the messaging system 200 may particularly correspond to a portion of the messaging servers 110 described with reference to FIG. 1 comprising one or more server devices providing messaging services to the user of the messaging system 200.

The messaging system 200 may comprise a domain name front end 210. The domain name front end 210 may be assigned one or more domain names associated with the messaging system 200 in a domain name system (DNS). The domain name front end 210 may receive incoming connections and distribute the connections to servers providing various messaging services.

The messaging system 200 may comprise one or more chat servers 215. The chat servers 215 may comprise front-end servers for receiving and transmitting user-to-user messaging updates such as chat messages. Incoming connections may be assigned to the chat servers 215 by the domain name front end 210 based on workload balancing.

The messaging system 200 may comprise backend servers 230. The backend servers 230 may perform specialized tasks in the support of the chat operations of the front-end chat servers 215. A plurality of different types of backend servers 230 may be used. It will be appreciated that the assignment of types of tasks to different backend serves 230 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 200 may comprise one or more offline storage servers 231. The one or more offline storage servers 231 may store messaging content for currently-offline messaging endpoints in hold for when the messaging endpoints reconnect.

The messaging system 200 may comprise one or more sessions servers 232. The one or more session servers 232 may maintain session state of connected messaging endpoints.

The messaging system 200 may comprise one or more presence servers 233. The one or more presence servers 233 may maintain presence information for the messaging system 200. Presence information may correspond to user-specific information indicating whether or not a given user has an online messaging endpoint and is available for chatting, has an online messaging endpoint but is currently away from it, does not have an online messaging endpoint, and any other presence state.

The messaging system 200 may comprise one or more push storage servers 234. The one or more push storage servers 234 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 200 may comprise one or more chat activity monitoring servers 235. The one or more chat activity monitoring servers 235 may monitor the chats of users to determine unauthorized or discouraged behavior by the users of the messaging system 200. The one or more chat activity monitoring servers 235 may work in cooperation with the spam logging servers 239 and block list servers 236, with the one or more chat activity monitoring servers 235 identifying spam or other discouraged behavior and providing spam information to the spam logging servers 239 and blocking information, where appropriate to the block list servers 236.

The messaging system 200 may comprise one or more block list servers 236. The one or more block list servers 236 may maintain user-specific block lists, the user-specific incoming-block lists indicating for each user the one or more other users that are forbidden from transmitting messages to that user. Alternatively or additionally, the one or more block list servers 236 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging system 200 may comprise one or more last seen information servers 237. The one or more last seen information servers 237 may receive, store, and maintain information indicating the last seen location, status, messaging endpoint, and other elements of a user's last seen connection to the messaging system 200.

The messaging system 200 may comprise one or more profile photo servers 238. The one or more profile photo servers 238 may store and make available for retrieval profile photos for the plurality of users of the messaging system 200.

The messaging system 200 may comprise one or more spam logging servers 239. The one or more spam logging servers 239 may log known and suspected spam (e.g., unwanted messages, particularly those of a promotional nature). The one or more spam logging servers 239 may be operative to analyze messages to determine whether they are spam and to perform punitive measures, in some embodiments, against suspected spammers (users that send spam messages).

The messaging system 200 may comprise one or more statistics servers 240. The one or more statistics servers may compile and store statistics information related to the operation of the messaging system 200 and the behavior of the users of the messaging system 200.

The messaging system 200 may comprise one or more sync servers 241. The one or more sync servers 241 may sync the messaging system 240 with contact information from a messaging endpoint, such as an address book on a mobile phone, to determine contacts for a user in the messaging system 200.

The messaging system 200 may comprise one or more web servers 242. The one or more web servers 242 may engage in hypertext transport protocol (HTTP) and hypertext transport protocol secure (HTTPS) connections with web browsers. The one or more web servers 242 may, in some embodiments, host the remote web server 350 as part of the operation of the encrypted message system 100.

The messaging system 200 may comprise one or more key servers 243. The one or more key servers 243 may host public keys for public/private key encrypted communication.

The messaging system 200 may comprise one or more group servers 244. The one or more group servers 244 may maintain lists of groups, add users to groups, remove users from groups, and perform the reception, caching, and forwarding of group chat messages.

The messaging system 200 may comprise one or more multimedia database (MMD) servers 245. The MMD servers 245 may store a database, which may be a distributed database, of media objects known to the messaging system 200. In some embodiments, only media objects currently stored or otherwise in-transit within the messaging system 200 may be tracked by the MMD servers 245. In other embodiments, the MMD servers 245 may maintain a record of media objects that are no longer in-transit, such as may be for tracking popularity or other data-gathering purposes.

The MMD servers 245 may determine the storage location of media objects when they are to be stored by the messaging system 200, such as on multimedia servers 246. The MMD servers 245 may determine the existing storage location of media objects when they are to be transmitted by the messaging system 200, such as which of a plurality of multimedia servers 236 store a particular media object. The MMD servers 245 may generate the uniform resource locators (URLs) for use by messaging clients to request and retrieve media objects. The MMD servers 245 may track when a media object has been corrupted or otherwise lost and should be reacquired.

The messaging system 200 may comprise one or more multimedia servers 246. The one or more multimedia servers may store multimedia (e.g., images, video, audio) in transit between messaging endpoints, multimedia cached for offline endpoints, and may perform transcoding of multimedia.

The messaging system 200 may comprise one or more payment servers 247. The one or more payment servers 247 may process payments from users. The one or more payment servers 247 may connect to external third-party servers for the performance of payments.

The messaging system 200 may comprise one or more registration servers 248. The one or more registration servers 248 may register new users of the messaging system 200.

The messaging system 200 may comprise one or more voice relay servers 249. The one or more voice relay servers 249 may relay voice-over-internet-protocol (VoIP) voice communication between messaging endpoints for the performance of VoIP calls.

Figure 3:
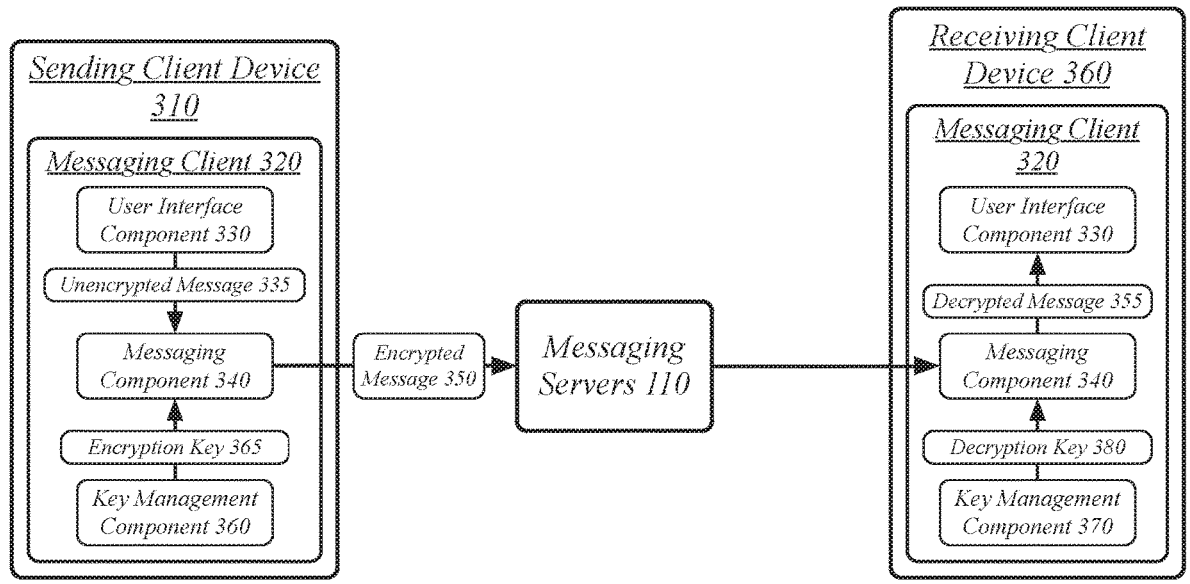
FIG. 3 illustrates an embodiment of a message sending and decryption by the encrypted message system.

FIG. 3 illustrates an embodiment of a message sending and decryption by the encrypted message system 100.

The sending client device 310 and receiving client device 360 may be two of a plurality of client devices communicating using a messaging system and implementing the encrypted message system 100. The assignment of a device as a sending client device 310 and receiving client device 360 may correspond to the specific interaction being described in FIG. 3 and may not reflect any particular division of capabilities between the client devices 310, 360. Every messaging client 320 on every client device supported by the messaging system may support both sending and receive message and media items. Each of the client devices 310, 360 executes a messaging client 320. The messaging client 320 on each device comprises a plurality of components. The plurality of components may comprise software components. The components of the messaging client 320 may include additional components to those described here and the operations of the messaging client 320 may be divided between components in different configurations in different embodiments.

The messaging client 320 may comprise a messaging component 340. The messaging component 340 may be generally arranged to perform the interactions between the messaging client 320 and the messaging servers 110. The messaging component 340 may send network communication to and receive network communication from messaging servers 110 of the messaging system. The messaging component 340 may send and receive messages, such as an encrypted message 350, via an exchange of message packages comprising updates to the state of a message thread.

The messaging client 320 may comprise a user interface component 330. The user interface component 330 may be generally arranged to present information to a user of a client device and receive user commands from the user of the client device. The user interface component 330 may display visual information, output audio information, and otherwise present information to a user. The user interface component 330 may receive touch commands, text commands, voice commands, and any other sort of command for the operation of the messaging client 320.

The messaging client 320 may comprise a key management component 360. The key management component 360 may maintain the keys used to encrypt and/or decrypt messages sent as part of the encrypted message system 100. The key management component 360 may provide encryption and decryption keys to the messaging component 340 for the encryption and decryption of messages.

A particular sequence of messages, such as may be associated with a message thread or message system feature, may be associated for encryption and decryption according to a particular sequence of keys generated based on key ratcheting. For instance, live location updates from a particular user may be associated with a particular sequence of ratcheted keys.

The messaging component 340 on the sending client device 310 received an unencrypted message 335 to be sent to a receiving client device 360. In some cases, an unencrypted message 335 may be received from a user interface component 330, such as where the unencrypted message 335 is a text message or other user-generated message. In other cases, an unencrypted message 335 may be received from a different component, such as a live-location update received from a geolocation component operative to determine and provide location information for the sending client device 310.

The messaging component 340 on the sending client device encrypts the unencrypted message 335 according to an encryption key 365 to generate an encrypted message 350. The encryption key 365 is determined by the key management component 360 according to a multi-dimensional ratcheting encryption scheme. The use of the multi-dimensional ratcheting encryption scheme by the sending client device 310 empowers the receiving client device 360 to skip over the generation of particular keys that would be used to decrypt one or more messages sent by the sending client device 310.

The messaging component 340 on the sending client device 310 sends the encrypted message 350 to the receiving client device 360. In some embodiments, the messaging component 340 may send the encrypted message 350 via the messaging servers 110 of a messaging system. In other embodiments, the messaging component 340 may send the encrypted message 350 using peer-to-peer communication. The messaging component 340 on the receiving client device 360 thereby receives the encrypted message 350, the encrypted message 350 encrypted according to the multi-dimensional ratcheting encryption scheme. Where the messaging servers 110 are used, the messaging component 340 on the receiving client device 360 receives the encrypted message from a messaging server device.

The messaging component 340 determines a message iteration count for the encrypted message 350. The message iteration count marks the ordering and sequence information for the message for use, at least in part, in decrypting the encrypted message 350. The message iteration count may be a component of an unencrypted wrapper, such as part of an unencrypted header, for the encrypted message 350, with the secret, private, or otherwise protected information of the encrypted message 350 in an encrypted payload of the encrypted message 350. The encrypted message 350 and the unencrypted wrapper may be sent via the messaging servers 110 as part of a message package. The messaging component 340 may determine the message iteration count by extracting it from the unencrypted wrapper for the encrypted message 350.

The messaging component 340 provides the message iteration count to the key management component 370 for use in determining the decryption key 380 for use in decrypting the encrypted message 350, such as for use in decrypting the encrypted payload of the encrypted message 350. The messaging component 340 may provide additional information, such as information to identify the particular set of client chain keys for use in decrypting the encrypted message 350. The key management component 370 provides the decryption key 380 to the messaging component 340. The decryption key 380 may be the same as the encryption key 365, where symmetric encryption is used, or may be a distinct key, where asymmetric encryption is used. The messaging component 340 generates a decrypted message 355 by decrypting the encrypted message 350 based on the decryption key 380. The decrypted message 355 corresponds to the unencrypted message 335 on the sending client device 310. The messaging component 340 passed the decrypted message 355 to the user interface component 330. The user interface component 330 may then display the decrypted message 355 on the receiving client device 360.

The key management component 360 on the sending client device 310 changes the key each time it sends a message using a ratchet function. It also increments the corresponding message iteration count, giving the number of times the ratchet was applied to advance the key. Receivers then use this message iteration count to ratchet its copy of the key to the appropriate count to decrypt the encrypted message 350.

In a multi-dimensional ratcheting encryption scheme a plurality of message chain keys are maintained by the key management component 360. This plurality of message chain keys are initialized as a group during a key exchange between the sending client device 310 and the receiving client device 360. As the use of a multi-dimensional ratcheting encryption scheme increases the number of keys in use, the use of the scheme increases the network and storage costs of setting up the keys between the client devices 310, 360 as a tradeoff for decreasing the computational cost of advancing forward multiple keys.

After the unencrypted message 335 is encrypted according to the encryption key 365 to generate the encrypted message 350, the plurality of chain keys are ratcheted forward one step. Each of the chain keys uses a distinct ratchet function. The plurality of ratchet functions may each be instances of a general encryption function that is able to take multiple inputs, such that one of the inputs is assigned a different value for each of the dimensions of the multi-dimensional ratcheting encryption scheme, thereby distinguishing the ratcheting functions used for each of the chain keys and generating the plurality of ratcheting functions associated with each of the plurality of chain keys.

A highest-dimension chain key is inspected to determine whether it should be advanced or regenerated. Each of the chain keys is associated with an iteration count indicating how many times that chain key has been ratcheted since it was generated. When this iteration count reaches a maximum chain key iteration value, the chain key is regenerated based on the next-lower-dimension chain key, which is then itself ratcheted, and the iteration count is reset. If the iteration count has not yet reached the maximum chain key iteration value, then the chain key is advanced one step according to a highest-dimension ratchet function. This technique is used for any dimension of chain key, advancing where allowed, regenerating from a lower-dimension chain key when the maximum iteration value has been reached. If the lowest-dimension chain key reaches the maximum iteration value, a whole new set of chain keys is generated and shared between the devices 310, 360.

To determine which chain keys are to be used, the key management component 370 decomposes the message iteration count into a plurality of message chain key iteration counts. The key management component 370 determines the decryption key 380 based on the plurality of message chain key iteration counts by, if needed, ratcheting forward its current client chain keys.

The decryption key 380 is based on the plurality of client chain keys. The plurality of client chain keys corresponds to the plurality of dimensions of the multi-dimensional ratcheting encryption scheme. The use of this plurality of dimensions empowers variable-step advancement of the plurality of client chain keys. Variable-step advancement of the plurality of client chain keys corresponds to discarding one or more encrypted messages as the skipped client chain keys are not useful if the encrypted messages they are associated with are discarded.

The key management component 370 retrieves a plurality of client chain keys, with this plurality of client chain keys corresponding to the plurality of dimensions of the multi-dimensional ratcheting encryption scheme. The plurality of client chain keys also corresponds to the plurality of client chain key iteration counts indicating how many times each of the chain keys has been ratcheted since it was generated based on a lower-dimension chain key.

If the key management component 370 determines that the plurality of client chain key iteration counts equals the plurality of message chain key iteration counts, which means that the chain key advancement of the received encrypted message 350 is as expected, is the next in line, then the retrieved client chain keys do not need to be ratcheted in order to generate the decryption key 380. Instead, the key management component 370 determines the decryption key 380 as a highest-dimension client chain key of the plurality of client chain keys.

The key management component 370 advances the chain key iteration count one step in response to decrypting the encrypted message 350. The key management component 370 then advances the highest-dimension client chain key where allowed by the maximum iteration value and regenerates it when the count for that chain key has reached the maximum iteration value. The key management component 370 advances the highest-dimension client chain key by one step in response to decrypting the encrypted message 350 where a highest-dimension client chain key iteration count corresponding to the highest-dimension client chain key is less than a maximum chain key iteration value.

The key management component 370 advances two or more client chain keys of the plurality of client chain keys in response to decrypting the encrypted message 350 where a highest-dimension client chain key iteration count corresponding to the highest-dimension client chain key is equal to a maximum chain key iteration value. A replacement highest-dimension client chain key is generated based on the next-lowest chain key, such as by using the next-lowest chain key as the input to a highest-dimension ratcheting function. The next-lowest chain key is then ratcheted, either advancing by one step or being recursively generated by a lower-dimension chain key, which recursion may continue through further lower-dimension chain keys if the chain key iteration counts for the lower-dimension chain keys reaches the maximum chain key iteration value. As such, the recursion may continue to the lowest-dimension chain key if all non-lowest-dimension chain keys are regenerated.

The key management component 370 may determine based on the message iteration count that one or more messages are to be discarded. The messaging component 340 may determine that one or more messages are to be discarded based on being out-of-date and provide the message iteration count for the first message after the skipped messages that is to be decrypted. The key management component 370 may then skip over generating decryption keys for at least some of the skipped messages.

The key management component 370 may determine that a client iteration count is less than the message iteration count. The client iteration count corresponds to a composition of the plurality of client chain key iteration counts, with the plurality of client chain key iteration counts therefore a decomposition of the client iteration count. The key management component 370 then generates a plurality of ratcheted client chain keys by advancing the plurality of client chain keys based on a iteration distance between the client iteration count and the message iteration count.

The key management component 370 determines whether, in the process of ratcheting forward a client chain key to the appropriate message chain key iteration count, that client chain key would be regenerated from a lower-dimension client chain key. If so, that client chain key doesn't need to actually be ratcheted forward to its maximum iteration value, and can instead be regenerated while refraining from ratcheting forward to the maximum iteration value. Each of the client chain keys is considered from the lowest-dimension to the highest, and ratcheted forward the number of times needed to increase that client chain key's associated client chain key iteration count to the received message chain key iteration count, producing a ratcheted client chain key. The higher-dimension client chain keys are therefore only ratcheted forward after any lower-dimension client chain keys are ratcheted forward to whatever extent they will be in advancing the client iteration count to the message iteration count. As such, advancing the plurality of client chain keys may comprise regenerating a higher-dimension client chain key based on advancing a lower-dimension client chain key, wherein regenerating the higher-dimension client chain key skips over one or more allowed iteration counts of the higher-dimension client chain key. The key management component 370 then determines the decryption key as a highest-dimension ratcheted client chain key of the plurality of ratcheted client chain keys.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
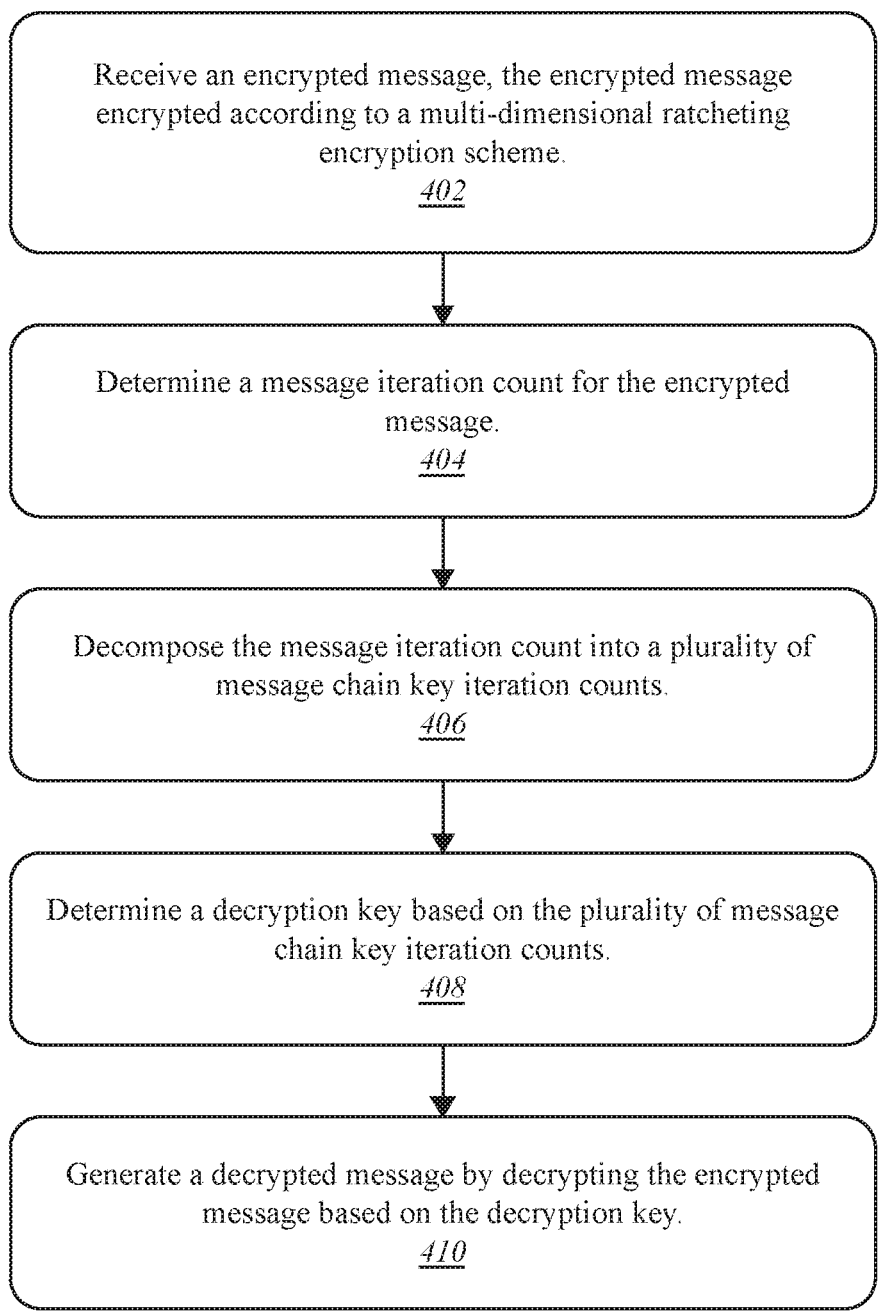
FIG. 4 illustrates an embodiment of a logic flow for the system of FIG. 1.

FIG. 4 illustrates one embodiment of a logic flow 400. The logic flow 400 may be representative of some or all of the operations executed by one or more embodiments described herein.

In the illustrated embodiment shown in FIG. 4, the logic flow 400 may receive an encrypted message, the encrypted message encrypted according to a multi-dimensional ratcheting encryption scheme at block 402.

The logic flow 400 may determine a message iteration count for the encrypted message at block 404.

The logic flow 400 may decompose the message iteration count into a plurality of message chain key iteration counts at block 406.

The logic flow 400 may determine a decryption key based on the plurality of message chain key iteration counts at block 408.

The logic flow 400 may generate a decrypted message by decrypting the encrypted message based on the decryption key at block 410.

The embodiments are not limited to this example.

Figure 5:
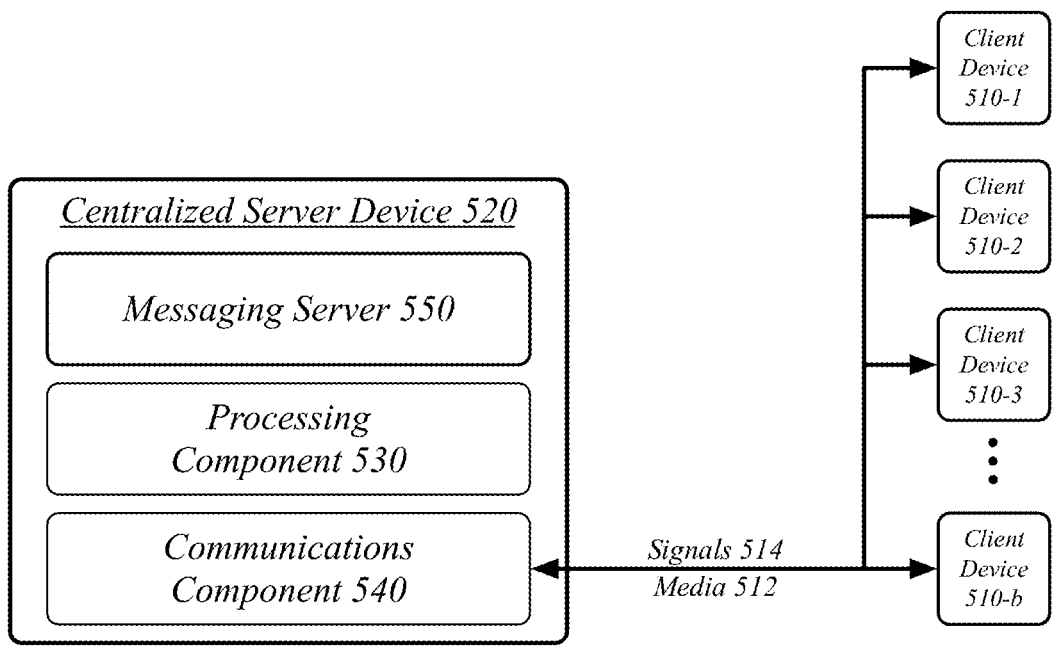
FIG. 5 illustrates an embodiment of a centralized system for the system of FIG. 1.

FIG. 5 illustrates a block diagram of a centralized system 500. The centralized system 500 may implement some or all of the structure and/or operations for the encrypted message system 100 in a single computing entity, such as entirely within a single centralized server device 520.

The centralized server device 520 may comprise any electronic device capable of receiving, processing, and sending information for the encrypted message system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 520 may execute processing operations or logic for the encrypted message system 100 using a processing component 530. The processing component 530 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 520 may execute communications operations or logic for the encrypted message system 100 using communications component 540. The communications component 540 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 540 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 512 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 520 may communicate with other devices over a communications media 512 using communications signals 514 via the communications component 540. The devices may be internal or external to the centralized server device 520 as desired for a given implementation.

The centralized server device 520 may execute a messaging server 550. The messaging server 550 may comprise a messaging server for a messaging system 110. The messaging server 550 may provide messaging operations for a plurality of client devices 510, receiving and sending messages between the client devices 510. The client devices 510 may correspond to one or more of a smartphone device 150, tablet device 160, personal computer device 170, and/or any other client device.

Figure 6:
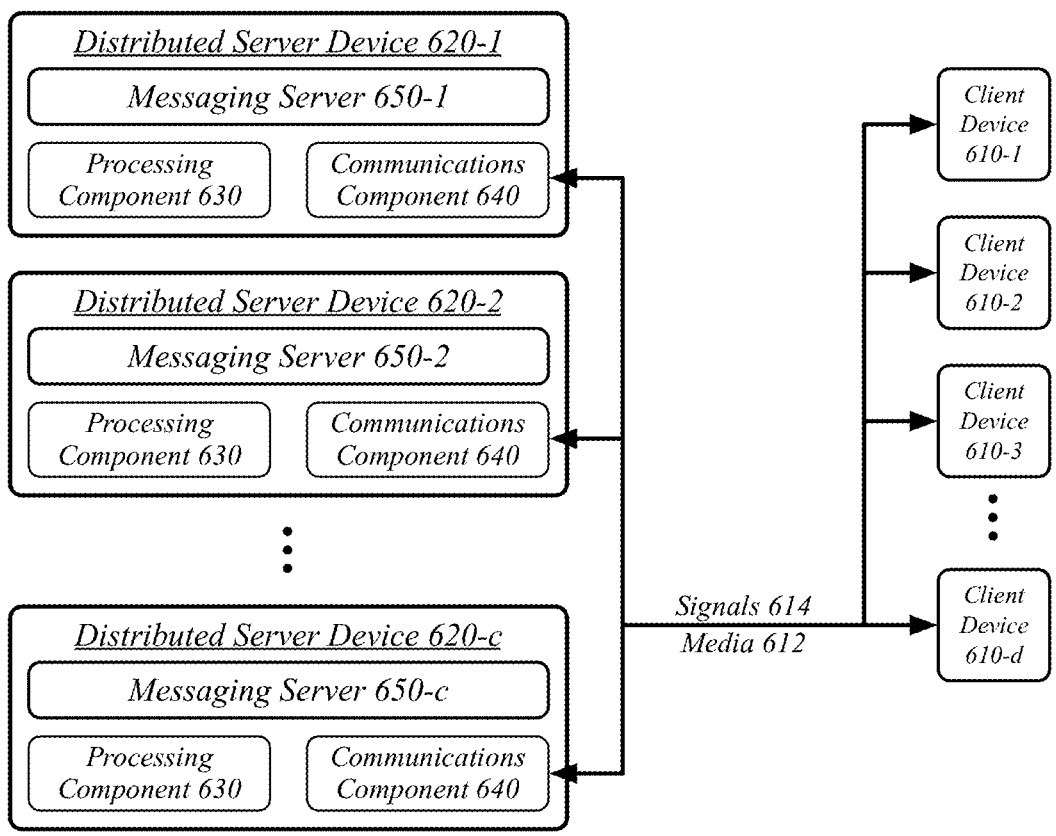
FIG. 6 illustrates an embodiment of a distributed system for the system of FIG. 1.

FIG. 6 illustrates a block diagram of a distributed system 600. The distributed system 600 may distribute portions of the structure and/or operations for the encrypted message system 100 across multiple computing entities. Examples of distributed system 600 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 600 may comprise a plurality of distributed server devices 620. In general, the distributed server devices 620 may be the same or similar to the centralized server device 620 as described with reference to FIG. 6. For instance, the distributed server devices 620 may each comprise a processing component 630 and a communications component 640 which are the same or similar to the processing component 730 and the communications component 740, respectively, as described with reference to FIG. 5. In another example, the distributed server devices 620 may communicate over a communications media 612 using communications signals 614 via the communications components 640.

The distributed server devices 620 may comprise or employ one or more server programs that operate to perform various methodologies in accordance with the described embodiments. In one embodiment, for example, the distributed server devices 620 may each execute one of a plurality of messaging servers 650. The messaging servers 650 may comprise messaging servers for a messaging system 110. The messaging servers 650 may provide messaging operations for a plurality of client devices 610, receiving and sending messages between the client devices 610. The client devices 610 may correspond to one or more of a smartphone device 150, tablet device 160, personal computer device 180, and/or any other client device.

Figure 7:
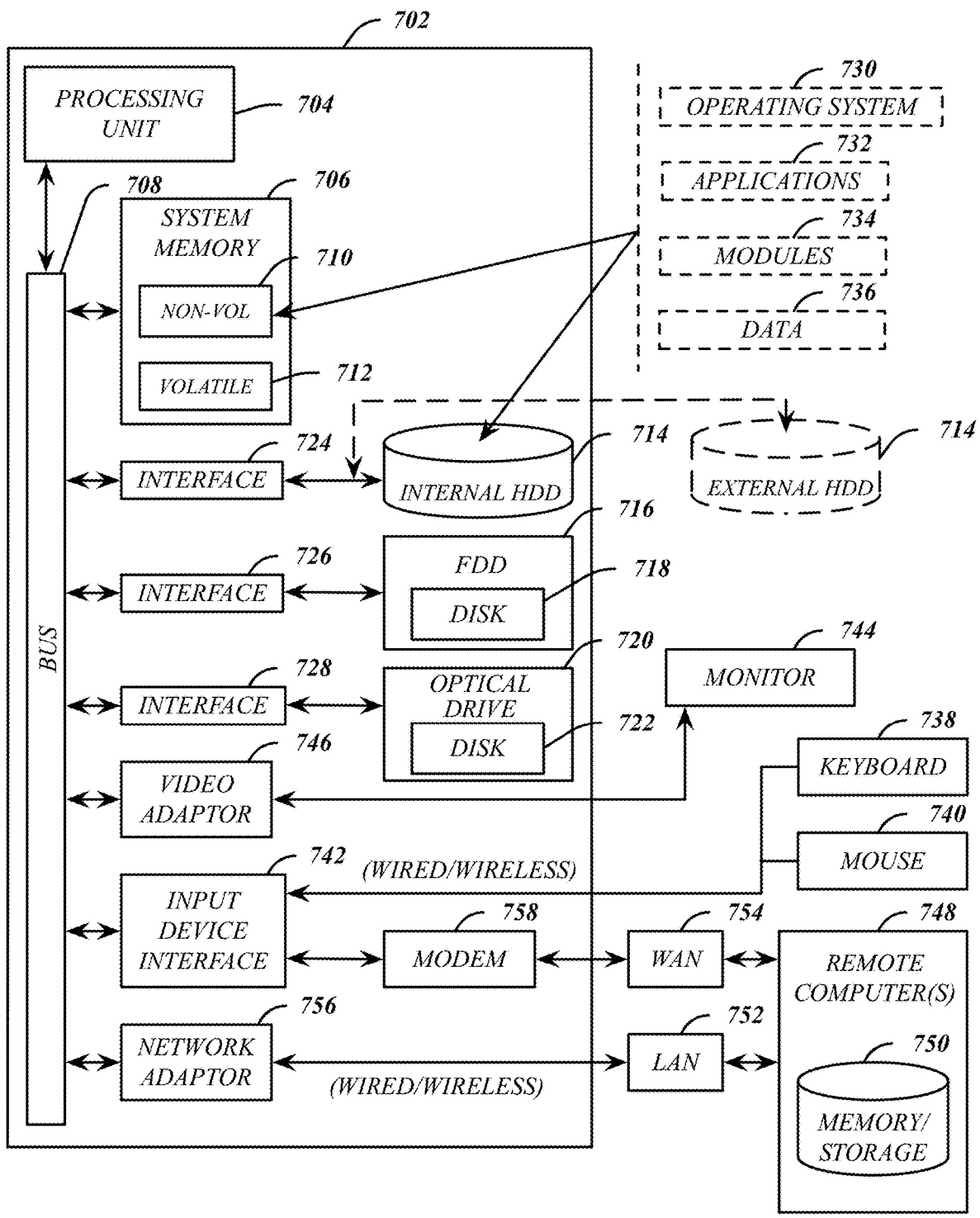
FIG. 7 illustrates an embodiment of a computing architecture.

FIG. 7 illustrates an embodiment of an exemplary computing architecture 700 suitable for implementing various embodiments as previously described. In one embodiment, the computing architecture 700 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chip-sets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the encrypted message system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756.

The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
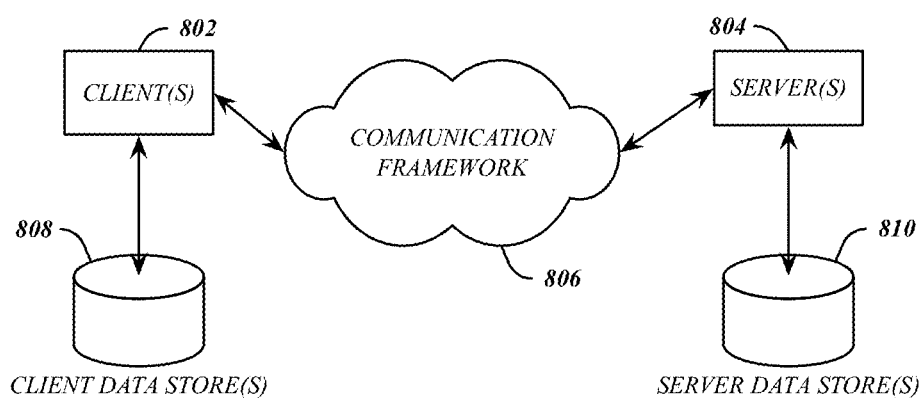
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 comprises includes one or more clients 802 and servers 804. The clients 802 may correspond to the described clients and client devices. The servers 804 may correspond to the described servers and server devices. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques and protocols. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 806 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 9:
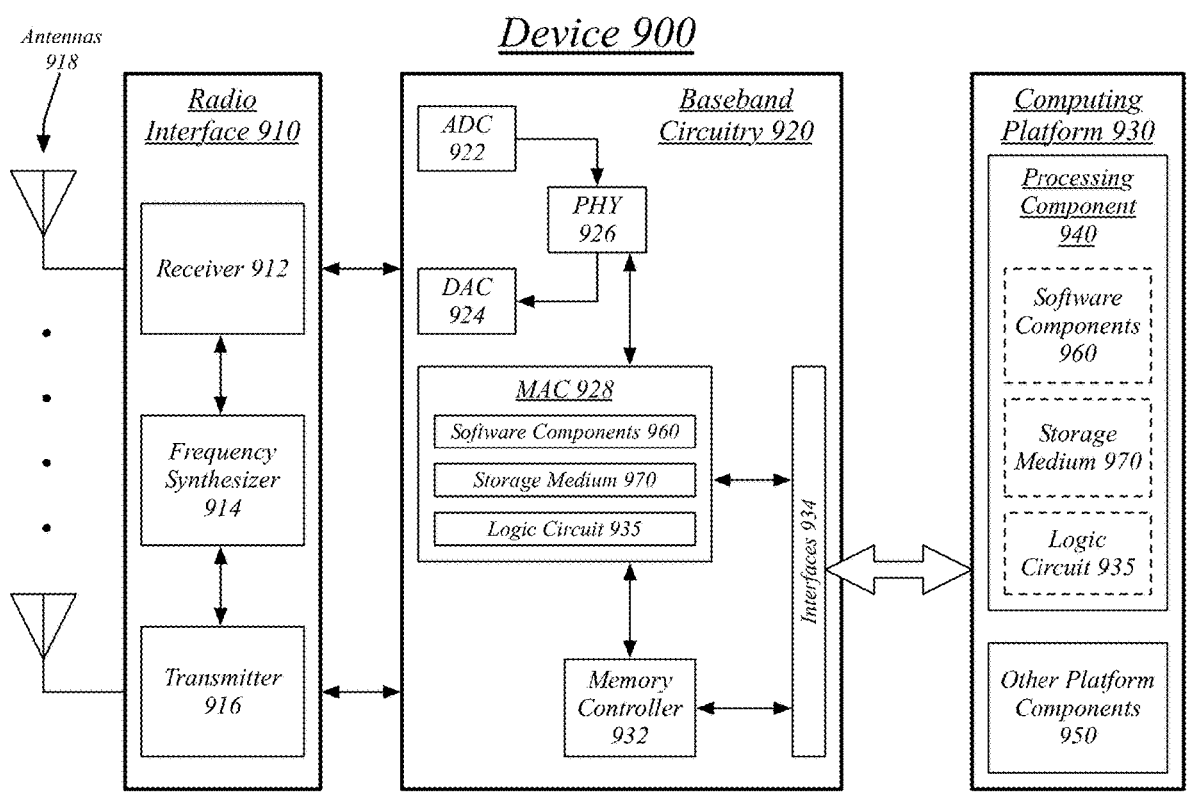
FIG. 9 illustrates an embodiment of a radio device architecture.

FIG. 9 illustrates an embodiment of a device 900 for use in a multicarrier OFDM system, such as the encrypted message system 100. Device 900 may implement, for example, software components 960 as described with reference to encrypted message system 100 and/or a logic circuit 935. The logic circuit 935 may include physical circuits to perform operations described for the encrypted message system 100. As shown in FIG. 9, device 900 may include a radio interface 910, baseband circuitry 920, and computing platform 930, although embodiments are not limited to this configuration.

The device 900 may implement some or all of the structure and/or operations for the encrypted message system 100 and/or logic circuit 935 in a single computing entity, such as entirely within a single device. Alternatively, the device 900 may distribute portions of the structure and/or operations for the encrypted message system 100 and/or logic circuit 935 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 910 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 910 may include, for example, a receiver 912, a transmitter 916 and/or a frequency synthesizer 914. Radio interface 910 may include bias controls, a crystal oscillator and/or one or more antennas 918. In another embodiment, radio interface 910 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 920 may communicate with radio interface 910 to process receive and/or transmit signals and may include, for example, an analog-to-digital converter 922 for down converting received signals, a digital-to-analog converter 924 for up converting signals for transmission. Further, baseband circuitry 920 may include a baseband or physical layer (PHY) processing circuit 956 for PHY link layer processing of respective receive/transmit signals. Baseband circuitry 920 may include, for example, a processing circuit 928 for medium access control (MAC)/data link layer processing. Baseband circuitry 920 may include a memory controller 932 for communicating with processing circuit 928 and/or a computing platform 930, for example, via one or more interfaces 934.

In some embodiments, PHY processing circuit 926 may include a frame construction and/or detection module, in combination with additional circuitry such as a buffer memory, to construct and/or deconstruct communication frames, such as radio frames. Alternatively or in addition, MAC processing circuit 928 may share processing for certain of these functions or perform these processes independent of PHY processing circuit 926. In some embodiments, MAC and PHY processing may be integrated into a single circuit.

The computing platform 930 may provide computing functionality for the device 900. As shown, the computing platform 930 may include a processing component 940. In addition to, or alternatively of, the baseband circuitry 920, the device 900 may execute processing operations or logic for the encrypted message system 100 and logic circuit 935 using the processing component 940. The processing component 940 (and/or PHY 926 and/or MAC 928) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 930 may further include other platform components 950. Other platform components 950 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 900 described herein, may be included or omitted in various embodiments of device 900, as suitably desired. In some embodiments, device 900 may be configured to be compatible with protocols and frequencies associated one or more of the 3GPP LTE Specifications and/or IEEE 902.16 Standards for WMANs, and/or other broadband wireless networks, cited herein, although the embodiments are not limited in this respect.

Embodiments of device 900 may be implemented using single input single output (SISO) architectures. However, certain implementations may include multiple antennas (e.g., antennas 918) for transmission and/or reception using adaptive antenna techniques for beamforming or spatial division multiple access (SDMA) and/or using MIMO communication techniques.

The components and features of device 900 may be implemented using any combination of discrete circuitry, application specific integrated circuits (ASICs), logic gates and/or single chip architectures. Further, the features of device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving an encrypted message, the encrypted message encrypted according to a multi-dimensional ratcheting encryption scheme; determine a message iteration count for the encrypted message; decomposing the message iteration count into a plurality of message chain key iteration counts; determining a decryption key based on the plurality of message chain key iteration counts; and generating a decrypted message by decrypting the encrypted message based on the decryption key.

A computer-implemented method may further comprise receiving the encrypted message at a client device from a messaging server device; and displaying the decrypted message on the client device.

A computer-implemented method may further comprise the decryption key based on a plurality of client chain keys, the plurality of client chain keys corresponding to a plurality of dimensions of the multi-dimensional ratcheting encryption scheme, wherein the plurality of dimensions empowers variable-step advancement of the plurality of client chain keys.

A computer-implemented method may further comprise wherein variable-step advancement of the plurality of client chain keys corresponds to discarding one or more encrypted messages.

A computer-implemented method may further comprise advancing the chain key iteration count one step in response to decrypting the encrypted message.

A computer-implemented method may further comprise retrieving a plurality of client chain keys, the plurality of client chain keys corresponding to a plurality of dimensions of the multi-dimensional ratcheting encryption scheme, the plurality of client chain keys corresponding to a plurality of client chain key iteration counts; determining that the plurality of client chain key iteration counts equals the plurality of message chain key iteration counts; and determining the decryption key as a highest-dimension client chain key of the plurality of client chain keys.

A computer-implemented method may further comprise advancing the highest-dimension client chain key by one step in response to decrypting the encrypted message where a highest-dimension client chain key iteration count corresponding to the highest-dimension client chain key is less than a maximum chain key iteration value.

A computer-implemented method may further comprise advancing two or more client chain keys of the plurality of client chain keys in response to decrypting the encrypted message where a highest-dimension client chain key iteration count corresponding to the highest-dimension client chain key is equal to a maximum chain key iteration value.

A computer-implemented method may further comprise retrieving a plurality of client chain keys, the plurality of client chain keys corresponding to a plurality of dimensions of the multi-dimensional ratcheting encryption scheme, the plurality of client chain keys corresponding to a plurality of client chain key iteration counts; determining that a client iteration count is less than the message iteration count, the client iteration count corresponding to a composition of the plurality of client chain key iteration counts; generating a plurality of ratcheted client chain keys by advancing the plurality of client chain keys based on a iteration distance between the client iteration count and the message iteration count; and determining the decryption key as a highest-dimension ratcheted client chain key of the plurality of ratcheted client chain keys.

A computer-implemented method may further comprise wherein advancing the plurality of client chain keys comprises regenerating a higher-dimension client chain key based on advancing a lower-dimension client chain key, wherein regenerating the higher-dimension client chain key skips over one or more allowed iteration counts of the higher-dimension client chain key.

An apparatus may comprise a messaging component operative to receive an encrypted message, the encrypted message encrypted according to a multi-dimensional ratcheting encryption scheme; determine a message iteration count for the encrypted message; and generate a decrypted message by decrypting the encrypted message based on a decryption key; and a key management component operative on the processor circuit to decompose the message iteration count into a plurality of message chain key iteration counts; and determine the decryption key based on the plurality of message chain key iteration counts. The apparatus may be operative to implement any of the computer-implemented methods described herein.

At least one computer-readable storage medium may comprise instructions that, when executed, cause a system to perform any of the computer-implemented methods described herein.

A computer-implemented method may comprise: receiving an encrypted message, the encrypted message encrypted according to a multi-dimensional ratcheting encryption scheme; determining a message iteration count for the encrypted message; decomposing the message iteration count into a plurality of message chain key iteration counts; determining a decryption key based on the plurality of message chain key iteration counts; and generating a decrypted message by decrypting the encrypted message based on the decryption key.

A computer-implemented method may further comprise the decryption key based on a plurality of client chain keys, the plurality of client chain keys corresponding to a plurality of dimensions of the multi-dimensional ratcheting encryption scheme, wherein the plurality of dimensions empowers variable-step advancement of the plurality of client chain keys, the variable-step advancement of the plurality of client chain keys optionally corresponding to discarding one or more encrypted messages.

A computer-implemented method may further comprise retrieving a plurality of client chain keys, the plurality of client chain keys corresponding to a plurality of dimensions of the multi-dimensional ratcheting encryption scheme, the plurality of client chain keys corresponding to a plurality of client chain key iteration counts; determining that the plurality of client chain key iteration counts equals the plurality of message chain key iteration counts; and determining the decryption key as a highest-dimension client chain key of the plurality of client chain keys; and optionally advancing two or more client chain keys of the plurality of client chain keys in response to decrypting the encrypted message where a highest-dimension client chain key iteration count corresponding to the highest-dimension client chain key is equal to a maximum chain key iteration value, or optionally advancing the highest-dimension client chain key by one step in response to decrypting the encrypted message where a highest-dimension client chain key iteration count corresponding to the highest-dimension client chain key is less than a maximum chain key iteration value.

A computer-implemented method may further comprise retrieving a plurality of client chain keys, the plurality of client chain keys corresponding to a plurality of dimensions of the multi-dimensional ratcheting encryption scheme, the plurality of client chain keys corresponding to a plurality of client chain key iteration counts; determining that a client iteration count is less than the message iteration count, the client iteration count corresponding to a composition of the plurality of client chain key iteration counts; generating a plurality of ratcheted client chain keys by advancing the plurality of client chain keys based on a iteration distance between the client iteration count and the message iteration count; and determining the decryption key as a highest-dimension ratcheted client chain key of the plurality of ratcheted client chain keys; wherein advancing the plurality of client chain keys optionally comprising regenerating a higher-dimension client chain key based on advancing a lower-dimension client chain key, wherein regenerating the higher-dimension client chain key skips over one or more allowed iteration counts of the higher-dimension client chain key.

A computer-implemented method may further comprise wherein the message iteration count marks the ordering and sequence information for the message for use, at least in part, in decrypting the encrypted message, the message iteration count optionally being a component of an unencrypted wrapper, in particular an unencrypted header, for the encrypted message, with the secret, private, or otherwise protected information of the encrypted message being in an encrypted payload of the encrypted message, wherein the encrypted message and the unencrypted wrapper are optionally sent via messaging servers as part of a message package, and, by a messaging component, determining the message iteration count by extracting it from the unencrypted wrapper for the encrypted message.

An apparatus may comprise: a messaging component operative to receive an encrypted message, the encrypted message encrypted according to a multi-dimensional ratcheting encryption scheme; determine a message iteration count for the encrypted message; and generate a decrypted message by decrypting the encrypted message based on a decryption key; and a key management component operative on the processor circuit to decompose the message iteration count into a plurality of message chain key iteration counts; and determine the decryption key based on the plurality of message chain key iteration counts.

An apparatus may further comprise the decryption key based on a plurality of client chain keys, the plurality of client chain keys corresponding to a plurality of dimensions of the multi-dimensional ratcheting encryption scheme, wherein the plurality of dimensions empowers variable-step advancement of the plurality of client chain keys, the variable-step advancement of the plurality of client chain keys optionally corresponding to discarding one or more encrypted messages.

An apparatus may further comprise the key management component operative to retrieve a plurality of client chain keys, the plurality of client chain keys corresponding to a plurality of dimensions of the multi-dimensional ratcheting encryption scheme, the plurality of client chain keys corresponding to a plurality of client chain key iteration counts; determine that the plurality of client chain key iteration counts equals the plurality of message chain key iteration counts; determine the decryption key as a highest-dimension client chain key of the plurality of client chain keys; and advance two or more client chain keys of the plurality of client chain keys in response to decrypting the encrypted message where a highest-dimension client chain key iteration count corresponding to the highest-dimension client chain key is equal to a maximum chain key iteration value.

An apparatus may further comprise the key management component operative to retrieve a plurality of client chain keys, the plurality of client chain keys corresponding to a plurality of dimensions of the multi-dimensional ratcheting encryption scheme, the plurality of client chain keys corresponding to a plurality of client chain key iteration counts; determine that a client iteration count is less than the message iteration count, the client iteration count corresponding to a composition of the plurality of client chain key iteration counts; generate a plurality of ratcheted client chain keys by advancing the plurality of client chain keys based on a iteration distance between the client iteration count and the message iteration count; and determine the decryption key as a highest-dimension ratcheted client chain key of the plurality of ratcheted client chain keys; advancing the plurality of client chain keys optionally comprising regenerating a higher-dimension client chain key based on advancing a lower-dimension client chain key, wherein regenerating the higher-dimension client chain key skips over one or more allowed iteration counts of the higher-dimension client chain key.

An apparatus may further comprise wherein the message iteration count marks the ordering and sequence information for the message for use, at least in part, in decrypting the encrypted message, the message iteration count optionally being a component of an unencrypted wrapper, in particular an unencrypted header, for the encrypted message, with the secret, private, or otherwise protected information of the encrypted message being in an encrypted payload of the encrypted message, wherein the encrypted message and the unencrypted wrapper are optionally sent via messaging servers as part of a message package, and wherein the messaging component is operable to determine the message iteration count by extracting it from the unencrypted wrapper for the encrypted message.

At least one computer-readable storage medium may compromise instructions that, when executed, cause a system, in particular an apparatus as described above, to carry out all the steps of the methods described above.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
receiving a first encrypted message and a second encrypted message, the first and second encrypted messages encrypted according to a multi-dimensional ratcheting encryption scheme;
determining, via at least one processor, which of the first encrypted message or the second encrypted message is a most-recent message;
discarding, via the at least one processor, the first encrypted message and skipping decryption of the first encrypted message based at least in part on the determination that the second encrypted message is the most-recent message;
extracting, via the at least one processor, a message iteration count for the second encrypted message;
decomposing, via the at least one processor, the message iteration count into a plurality of message chain key iteration counts;
determining, by the at least one processor, a decryption key based on the plurality of message chain key iteration counts; and
generating, by the at least one processor, a decrypted message by decrypting the second encrypted message based on the decryption key.

2. The method of claim 1, the decryption key based on a plurality of client chain keys, the plurality of client chain keys corresponding to a plurality of dimensions of the multi-dimensional ratcheting encryption scheme, wherein the plurality of dimensions empowers variable-step advancement of the plurality of client chain keys.

3. The method of claim 2, wherein variable-step advancement of the plurality of client chain keys corresponds to discarding one or more encrypted messages, the one or more encrypted messages including the first encrypted message.

4. The method of claim 1, further comprising:
retrieving a plurality of client chain keys, the plurality of client chain keys corresponding to a plurality of dimensions of the multi-dimensional ratcheting encryption scheme, the plurality of client chain keys corresponding to a plurality of client chain key iteration counts;
determining that the plurality of client chain key iteration counts equals the plurality of message chain key iteration counts;
determining the decryption key as a highest-dimension client chain key of the plurality of client chain keys; and
advancing two or more client chain keys of the plurality of client chain keys in response to decrypting the second encrypted message where a highest-dimension client chain key iteration count corresponding to the highest-dimension client chain key is equal to a maximum chain key iteration value.

5. The method of claim 1, further comprising:
retrieving a plurality of client chain keys, the plurality of client chain keys corresponding to a plurality of dimensions of the multi-dimensional ratcheting encryption scheme, the plurality of client chain keys corresponding to a plurality of client chain key iteration counts;
determining that a client iteration count is less than the message iteration count, the client iteration count corresponding to a composition of the plurality of client chain key iteration counts;
generating a plurality of ratcheted client chain keys by advancing the plurality of client chain keys based on a iteration distance between the client iteration count and the message iteration count; and determining the decryption key as a highest-dimension ratcheted client chain key of the plurality of ratcheted client chain keys.

6. The method of claim 5, wherein advancing the plurality of client chain keys comprises regenerating a higher-dimension client chain key based on advancing a lower-dimension client chain key, wherein regenerating the higher-dimension client chain key skips over one or more allowed iteration counts of the higher-dimension client chain key.

7. An apparatus, comprising:
at least one processor for executing stored instructions to:
receive a first encrypted message and a second encrypted message, the first and second encrypted messages encrypted according to a multi-dimensional ratcheting encryption scheme;
determine which of the first encrypted message or the second encrypted message is a most-recent message;
discard the first encrypted message and skip decryption of the first encrypted message based at least in part on the determination that the second encrypted message is the most-recent message;
extract a message iteration count for the second encrypted message;
decompose the message iteration count into a plurality of message chain key iteration counts; and
determine the decryption key based on the plurality of message chain key iteration counts; and
generate a decrypted message by decrypting the second encrypted message based on a decryption key.

8. The apparatus of claim 7, the decryption key based on a plurality of client chain keys, the plurality of client chain keys corresponding to a plurality of dimensions of the multi-dimensional ratcheting encryption scheme, wherein the plurality of dimensions empowers variable-step advancement of the plurality of client chain keys.

9. The apparatus of claim 8, wherein variable-step advancement of the plurality of client chain keys corresponds to discarding one or more encrypted messages, the one or more encrypted messages including the first encrypted message.

10. The apparatus of claim 7, further comprising:
the key management component operative to retrieve a plurality of client chain keys, the plurality of client chain keys corresponding to a plurality of dimensions of the multi-dimensional ratcheting encryption scheme, the plurality of client chain keys corresponding to a plurality of client chain key iteration counts; determine that the plurality of client chain key iteration counts equals the plurality of message chain key iteration counts; determine the decryption key as a highest-dimension client chain key of the plurality of client chain keys; and advance two or more client chain keys of the plurality of client chain keys in response to decrypting the second encrypted message where a highest-dimension client chain key iteration count corresponding to the highest-dimension client chain key is equal to a maximum chain key iteration value.

11. The apparatus of claim 7, further comprising:
the key management component operative to retrieve a plurality of client chain keys, the plurality of client chain keys corresponding to a plurality of dimensions of the multi-dimensional ratcheting encryption scheme, the plurality of client chain keys corresponding to a plurality of client chain key iteration counts; determine that a client iteration count is less than the message iteration count, the client iteration count corresponding to a composition of the plurality of client chain key iteration counts; generate a plurality of ratcheted client chain keys by advancing the plurality of client chain keys based on a iteration distance between the client iteration count and the message iteration count; and determine the decryption key as a highest-dimension ratcheted client chain key of the plurality of ratcheted client chain keys.

12. The apparatus of claim 11, wherein advancing the plurality of client chain keys comprises regenerating a higher-dimension client chain key based on advancing a lower-dimension client chain key, wherein regenerating the higher-dimension client chain key skips over one or more allowed iteration counts of the higher-dimension client chain key.

13. At least one non-transitory computer-readable storage medium comprising instructions that, when executed by at least one processor, cause a system to:
receive a first encrypted message and a second encrypted message, the first and second encrypted messages encrypted according to a multi-dimensional ratcheting encryption scheme;
determine which of the first encrypted message or the second encrypted message is a most-recent message;
discard the first encrypted message and skip decryption of the first encrypted message based at least in part on the determination that the second encrypted message is the most-recent message;
extract a message iteration count for the second encrypted message;
decompose the message iteration count into a plurality of message chain key iteration counts;
determine a decryption key based on the plurality of message chain key iteration counts;
generate a decrypted message by decrypting the second encrypted message based on the decryption key.

14. The non-transitory computer-readable storage medium of claim 13, the decryption key based on a plurality of client chain keys, the plurality of client chain keys corresponding to a plurality of dimensions of the multi-dimensional ratcheting encryption scheme, wherein the plurality of dimensions empowers variable-step advancement of the plurality of client chain keys.

15. The non-transitory computer-readable storage medium of claim 14, wherein variable-step advancement of the plurality of client chain keys corresponds to discarding one or more encrypted messages, the one or more encrypted messages including the first encrypted message.

16. The non-transitory computer-readable storage medium of claim 13, comprising further instructions that, when executed by the at least one processor, cause the system to:
retrieve a plurality of client chain keys, the plurality of client chain keys corresponding to a plurality of dimensions of the multi-dimensional ratcheting encryption scheme, the plurality of client chain keys corresponding to a plurality of client chain key iteration counts;
determine that the plurality of client chain key iteration counts equals the plurality of message chain key iteration counts; and
determine the decryption key as a highest-dimension client chain key of the plurality of client chain keys.

17. The non-transitory computer-readable storage medium of claim 16, comprising further instructions that, when executed by the at least one processor, cause the system to:
advance the highest-dimension client chain key by one step in response to decrypting the second encrypted message where a highest-dimension client chain key iteration count corresponding to the highest-dimension client chain key is less than a maximum chain key iteration value.

18. The non-transitory computer-readable storage medium of claim 16, comprising further instructions that, when executed by the at least one processor, cause the system to:

advance two or more client chain keys of the plurality of client chain keys in response to decrypting the second encrypted message where a highest-dimension client chain key iteration count corresponding to the highest-dimension client chain key is equal to a maximum chain key iteration value.

19. The non-transitory computer-readable storage medium of claim 13, comprising further instructions that, when executed by the at least one processor, cause the system to:

retrieve a plurality of client chain keys, the plurality of client chain keys corresponding to a plurality of dimensions of the multi-dimensional ratcheting encryption scheme, the plurality of client chain keys corresponding to a plurality of client chain key iteration counts;

determine that a client iteration count is less than the message iteration count, the client iteration count corresponding to a composition of the plurality of client chain key iteration counts;

generate a plurality of ratcheted client chain keys by advancing the plurality of client chain keys based on an iteration distance between the client iteration count and the message iteration count; and determine the decryption key as a highest-dimension ratcheted client chain key of the plurality of ratcheted client chain keys.

20. The non-transitory computer-readable storage medium of claim 13, wherein advancing the plurality of client chain keys comprises regenerating a higher-dimension client chain key based on advancing a lower-dimension client chain key, wherein regenerating the higher-dimension client chain key skips over one or more allowed iteration counts of the higher-dimension client chain key.

* * * * *